United States Patent [19]

Younker

[11] Patent Number: 5,722,836

[45] Date of Patent: Mar. 3, 1998

[54] REFLECTED-IMAGE VIDEOENDOSCOPIC SURGICAL TRAINER AND METHOD OF TRAINING

[75] Inventor: Scott B. Younker, Vashon Island, Wash.

[73] Assignee: Simulab Corporation, Vashon Island, Wash.

[21] Appl. No.: 651,115

[22] Filed: May 21, 1996

[51] Int. Cl.⁶ .................................................. G09B 23/28
[52] U.S. Cl. ........................ 434/272; 434/267; 434/260; 434/258
[58] Field of Search .............................. 434/262, 267, 434/272, 258, 260

[56] References Cited

U.S. PATENT DOCUMENTS 4,058,910  11/1977  Funk .................................. 434/272 X
5,403,191  4/1995  Tuason ............................... 434/267 X

OTHER PUBLICATIONS

Advanced Surgical, Inc. Surgical Trainer Brochure, believed to have been published prior to May 21, 1996.

Primary Examiner—Jeffrey A. Smith
Attorney, Agent, or Firm—Christensen O'Connor Johnson & Kindness PLLC

[57] ABSTRACT

A videoendoscopic surgery training system (10) provides training in videoendoscopic surgery techniques. A base (14) supports a simulated anatomical structure (12). A shield (20) blocks a trainee's direct line-of-sight view of the simulated anatomical structure. A reflector assembly (24, 34) reflects an image of the simulated anatomical structure past the shield. A first mirror (24) reflects an image of the simulated anatomical structure that is oriented away from the trainee. A second mirror (34) optically communicates with the first mirror to reflect an image of the simulated anatomical structure that is oriented toward the trainee.

27 Claims, 3 Drawing Sheets

REFLECTED-IMAGE VIDEOENDOSCOPIC SURGICAL TRAINER AND METHOD OF TRAINING

FIELD OF THE INVENTION

The present invention relates to surgical training, and particularly to a structure for use in teaching videoendoscopic surgical techniques.

BACKGROUND OF THE INVENTION

In recent years many invasive surgical and operative medical procedures have been developed utilizing videoendoscopic techniques. Videoendoscopy reduces the trauma and recuperative periods associated with prior conventional surgical techniques. Videoendoscopic procedures have been developed for a wide variety of gynecological, chest, abdomen and urologic procedures, to place feeding tubes into the digestive tract, to take biopsies, to inspect for tumors, and to correct some types of infertility, by way of example. Additional techniques may be developed including endoscopic techniques for sinus surgery, esophagus repair, fetal surgery and prophylactic breast cancer surgery. Videoendoscopy entails inserting instruments through a small incision into an operative cavity. A narrow video camera is also inserted to guide the surgeon in manipulation of the endoscopic instruments.

For example, operations which take place in the abdomen are carried out by inserting trocar stops through the abdominal wall and peritoneum. A trocar supplied with air or an inert gas is inserted into the trocar stop, and gas flow is commenced to inflate the peritoneum. Video cameras and instruments are then inserted through the trocars to carry out the operation. Unlike prior conventional techniques, the surgeon is not able to rely on his or her sense of feel and direct tactile response during endoscopic surgery. Further, visual response is limited to the two-dimensional image viewed through the endoscopic video output, in which many structures may look similar. Depending on the orientation of the endoscopic video camera relative to the organ or other anatomic structure being endoscopically manipulated, the surgeon may see only an anterior image of the instruments and anatomic structure, or only a posterior image of the instruments and anatomic structure. It is thus critical that surgeons are taught and maintain videoendoscopic skills that help them to identify structure and to carefully control the endoscopic instruments to ensure that a surgical procedure is accurately performed without causing unnecessary damage to surrounding tissue.

Many endoscopic surgeries require suturing and knot tying to close incisions made during surgery. Typically, a double-ended needle secured to the end of a suture thread is manipulated by instruments during suturing. Suturing and knot tying via endoscopy are techniques that require great skill and precision.

Conventional techniques for teaching endoscopic surgery procedures involve the use of animal specimens. The use of laboratory animals for surgical training is very expensive and is sometimes also subject to popular debate. Additionally, animal specimens have a short viability on the operating table, and thus provide the trainee with a limited period of time in which to practice repeated techniques.

As an alternative to conducting animal studies, a surgical training device referred to as a pelvic trainer has been developed that consists of a tray containing rigid synthetic organs. The tray is covered with a clear latex sheet through which endoscopic instruments are poked. However, this device permits the trainee to directly view the simulated organs relative to the operative instruments. The trainee thus performs surgical techniques while viewing the instruments and simulated organs in three dimensions, and always from the anterior perspective. Because visual response in videoendoscopic surgical procedures is limited to the two-dimensional anterior or posterior image viewed through the endoscopic video output, the pelvic trainer does not provide realistic training.

Some videoendoscopic training systems shield a simulated surgical site from a trainee's view and use video cameras and monitors to relay video information to a trainee. This scheme is complex and expensive. Other endoscopic training systems that are being developed involve virtual-reality systems using robotics to mimic the mechanical feedback experienced by surgeons during endoscopic training. These systems are also highly complex and expensive. Further, the reliability, accuracy, and degree of realism provided by such systems have not yet been established.

There thus exists a need for systems and methods to train medical students and surgeons in endoscopic techniques that provide low-cost, realistic opportunities to practice videoendoscopic manipulation, incision and surgical procedures. In order to make this training most effective, trainees should be provided with realistic visual feedback during training.

SUMMARY OF THE INVENTION

The present invention provides an apparatus and method for videoendoscopic surgical training. The surgery trainer apparatus supports a simulated or actual anatomical structure, and blocks a trainee's direct line-of-sight view of the simulated anatomical structure. The surgery trainer reflects toward the trainee a two-dimensional image of the anatomical structure.

According to one aspect of the present invention, the surgery trainer reflects toward the trainee two-dimensional images of those features of the simulated anatomical structure that are oriented away from the trainee, i.e., a posterior image. The surgery trainer includes a first mirror for reflecting this two-dimensional posterior image.

According to another aspect of the present invention, the surgery trainer also reflects toward the trainee two-dimensional images of features of the simulated anatomical structure that are oriented toward the trainee, i.e., an anterior image. The surgery trainer includes a second mirror that operates in optical communication with the first mirror to reflect the two-dimensional anterior image. By positioning his or her head relative to the trainer, the trainee can selectively view either the anterior or posterior two-dimensional image of the anatomic structure and instruments while practicing surgical techniques.

The present invention provides a videoendoscopic surgical trainer that realistically simulates a surgeon's view of a videoendoscopic surgery site at a low cost. According to one embodiment of the present invention, a videoendoscopic surgery trainer includes a base with first and second opposing sides. The base is adapted to receive a simulated anatomical structure. A first wall projects substantially upward from the first side of the base. A second wall projects substantially upward from the second side of the base, and the second wall has a height such that the trainee's direct line-of-sight view of the simulated anatomical structure is blocked when standing or sitting facing the second wall in front of a table on which the trainer is mounted. A first mirror is attached to the first wall, and a reflective surface of the mirror is oriented facing inward (i.e., toward the anatomical structure) from the first wall for reflecting toward the trainee, and past the second wall, two-dimensional images of those features of the simulated anatomical structure that are oriented toward the first wall and, thus, away from the trainee.

According to another aspect of the invention, the surgery trainer further provides a second mirror attached to the second wall. A reflective surface of the second mirror is oriented facing inward from the second wall. The second mirror and the first mirror optically communicate to reflect toward the trainee, and past the second wall, two-dimensional images of those features of the simulated anatomical structure that are oriented toward the second mirror, and thus toward the trainee.

According to another aspect of the present invention, the surgery trainer of the present invention is portable. In one embodiment of the present invention, the first and second walls are collapsible toward the base.

Routine skills such as videoendoscopic suturing and knot tying can be repeatedly practiced by trainees on a low-cost videoendoscopic surgery trainer. The present invention thus provides an opportunity for training to develop realistic videoendoscopic surgical skills.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
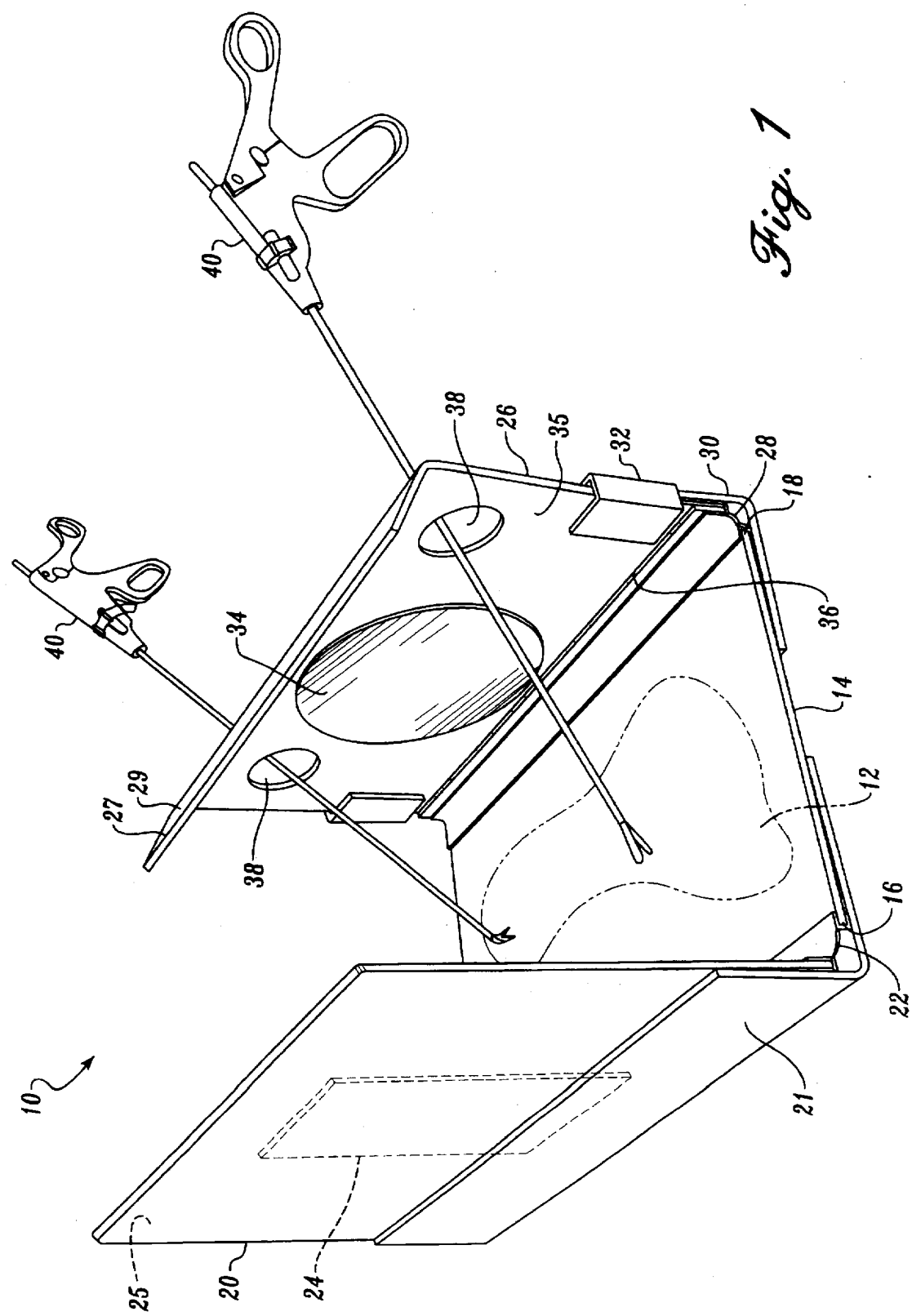
FIG. 1 provides a three-dimensional view of a videoendoscopic surgical trainer system constructed in accordance with the present invention.

A videoendoscopic surgery training system 10 constructed in accordance with the present invention is shown in FIG. 1. The system 10 is arranged to support a simulated anatomical structure 12 on a base 14. Simulated anatomical structure 12 can include one of a number of conventional simulated anatomical structures for practicing videoendoscopic surgery techniques such as incising, dissecting, suturing, and knot tying. For example, simulated anatomical structure 12 may include a suture procedure pack as described in applicant's U.S. Pat. No. 5,620,326, filed Jun. 9, 1995, for "Anatomical Simulator for Videoendoscopic Surgical Training" expressly incorporated herein. The training system of the present invention is especially well-suited for training surgeons and medical students in suturing and knot-tying techniques. However, it will be appreciated that the training system of the present invention is not so limited, and other videoendoscopic surgery techniques may also be practiced with the training system of the present invention. Likewise, the trainer of the present invention may also be used to practice surgery on actual anatomical structures, such as animal organs.

Figure 3:
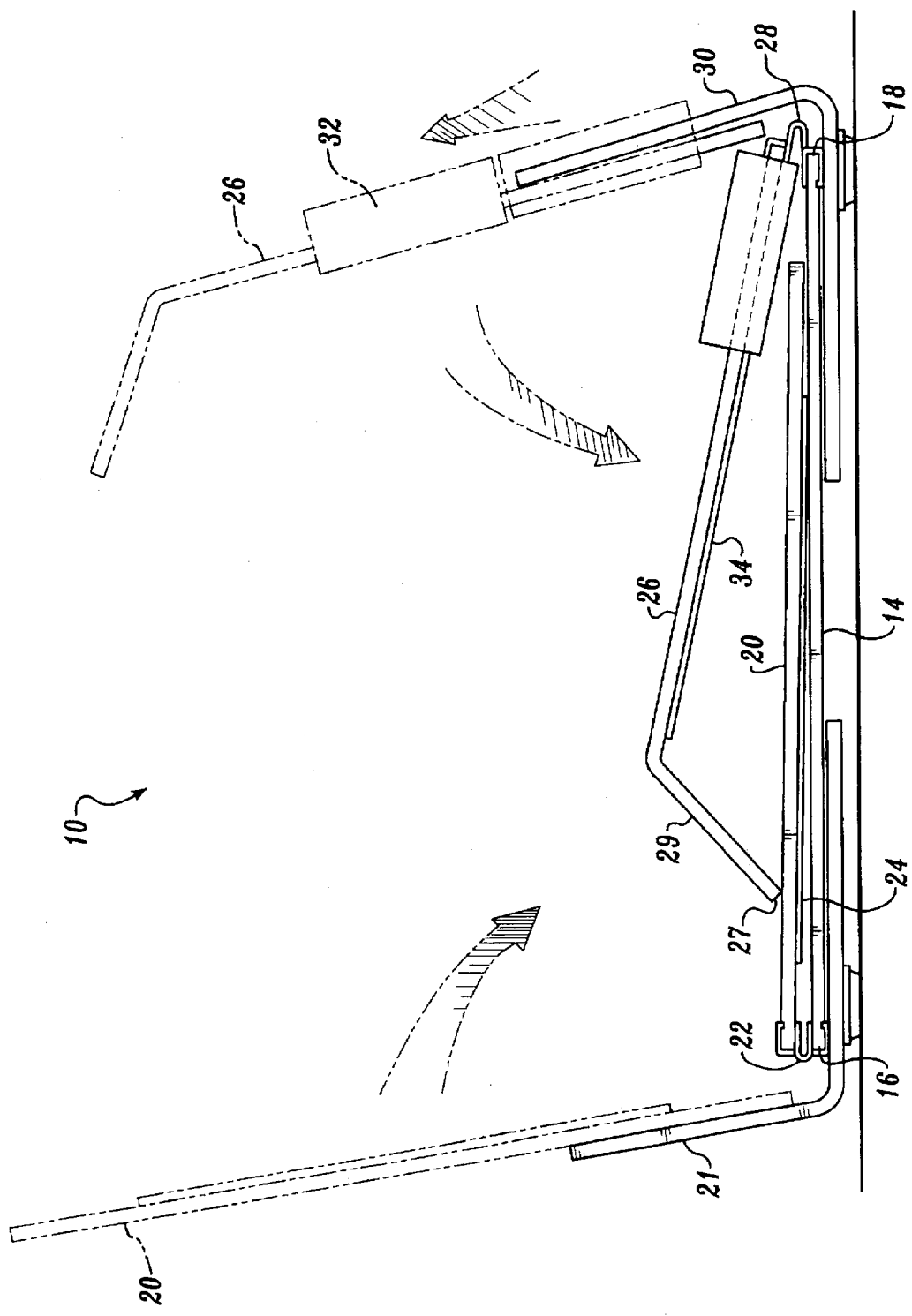
FIG. 3 provides an end view of a videoendoscopic surgical trainer of FIG. 1 with the sidewalls folded downwardly against the base.

As shown in FIG. 1, base 14 of the preferred embodiment is a substantially rectangular plate with a first side 16 and a parallel second side 18. First side 16 and second side 18 are on substantially opposing sides of base 14. System 10 includes a first wall 20. As shown in FIG. 1, first wall 20 projects substantially upward from first side 16 of base 14 during use at an obtuse angle $\alpha$, as measured from the plane of base 14. Angle $\alpha$ is suitably oriented between 90° and 120° from the plane of base 14, and is preferably about 105° from the plane of base 14. A first flange 21 projects upwardly from first side 16 of base 14. First wall 20 rests against first flange 21 at angle $\alpha$. First wall 20 is preferably attached to base 14 with a hinge 22. Hinge 22 may be any one of a number of conventional hinges, such as a piano hinge or a lightweight unitary extruded plastic hinge. According to a preferred embodiment of the present invention, and as shown in FIG. 3, first wall 20 is collapsible toward base 14 by folding first wall 20 downwardly to lie parallel to base 14. Collapsibility of first wall 20 contributes to portability of system 10.

A first mirror 24 is attached centrally to an inner surface 25 of first wall 20. The reflective surface of first mirror 24 is oriented away from first wall 20, i.e., toward an opposing second wall 26. As shown in FIG. 1, first mirror 24 may have a rectangular shape. However, it is not necessary that first mirror 24 have a rectangular shape. Any shape is acceptable for first mirror 24.

System 10 also includes a second wall 26. Second wall 26 is arranged to block or shield a trainee's direct line-of-sight view of simulated anatomical structure 12 when the trainer positions his or her head to face toward and look over top edge 27 of the second wall 26. As shown in FIG. 1, second wall 26 projects substantially upward from second side 18 of base 14 during use. During use, second wall 26 is substantially parallel to first wall 20, and is thus oriented at an acute angle $\beta$ from the plane of base 14. Angle $\beta$ is substantially between 60° and 90° from the plane of base 14, and is preferably about 75° from the plane of base 14. The second wall 26 includes an inclined upper segment 29 that terminates in the top edge 27. The inclined upper segment 29 spans the width of second wall 26, and is angled inwardly away from a plane defined by the remainder of the second wall 26 and toward the first wall 20. The upper segment 26 aids in shielding from the trainee the anatomical structure received on base 14. Second wall 26 is preferably attached to base 14 with a hinge 28. Hinge 28 is similar to hinge 22 and may be any one of a number of conventional hinges as described above.

Base 14 includes a second flange 30 that extends upward from second side 18 of base 14 at the angle $\beta$ from the plane of base 14. Second wall 26 is held at angle $\beta$ by a retaining member 32 that is placed on second wall 26 and which cooperates with second flange 30. Retaining member 32 is shown in FIG. 1 as a strip with arcuate end sections that are adapted to wrap around second wall 26 and second flange 30. As shown in FIG. 1, retaining member 32 slides over second flange 30 to urge second wall 26 against second flange 30, thus maintaining second wall 26 at angle $\beta$ from base 14. When retaining member 32 is lifted upwardly from second flange 30, hinge 28 allows second wall 26 to collapse toward base 14, as shown in FIG. 3.

It should be apparent to those of ordinary skill in the art, based on the disclosure contained herein, that second wall 26 may be configured to have an adjustable height. This allows system 10 to be adapted for use by several trainees with different heights. For example, the inclined upper segment 29 of second wall 26 may be rotatably attached (not shown) to second wall 26. Angled section 27 could then be tilted to provide an adjustment to the height of second wall 26 as desired by the trainee. It will be appreciated that other arrangements could provide an adjustment to the height of second wall 26, such as, for example, attaching additional sections (not shown) to second wall 26, or providing a screw adjustment (not shown) on the bottom of base 14 below second side 18.

System 10 includes a second mirror 34 attached centrally to an inner surface 35 of second wall 26 below inclined upper segment 29. The reflective surface of second mirror 34 is oriented away from second wall 26. In one embodiment of the present invention, second mirror 34 is circular in shape. However, it is not necessary that second mirror 34 have a circular shape; second mirror 34 may have any shape.

First mirror 24 preferably provides a magnification power of substantially unity. However, it is not necessary that first mirror 24 have substantially unity magnification power. In one embodiment, first mirror 24 provides a magnification power of greater than unity; in another embodiment, first mirror 24 provides a magnification power of less than unity. Second mirror 34 is preferably a magnifying mirror; that is, it provides a magnification of greater than unity. However, a magnification power of greater than unity is not necessary. In one embodiment, second mirror 34 provides unity magnification power; in another embodiment, second mirror 34 provides a magnification power of less than unity. First mirror 24 and second mirror 34 optically communicate to mimic the magnification of the video output of a videoendoscopic camera and monitor. Thus, any combination of magnification powers of first mirror 24 and second mirror 34 that mimics videoendoscopic magnification is acceptable.

It will be appreciated by those skilled in the art that a trainer constructed without the second mirror 34 is within the scope of the present invention. In an alternate embodiment, first mirror 24 is provided as discussed above, and second mirror 34 is not present. However, in such an alternate embodiment, the reflected image is limited to a posterior view of the anatomical structure, and thus the inclusion of a second mirror is preferred.

An indicator 36 is provided on second wall 26 between second mirror 34 and base 14. Indicator 36 provides a demarcation between images oriented toward first wall 20 and images oriented toward second wall 26, as will be described later. As shown in FIG. 1, indicator 36 is suitably formed as a horizontal line or other indicia marked on inside surface 35 of second wall 26, below mirror 34, that substantially parallels the plane of base 14.

Second wall 26 defines apertures 38 for insertion of surgical instruments 40. Preferably, two apertures 38 are defined in second wall 26 below upper section 29 and above and on either side of mirror 34. During a practice session, a trainee can insert a surgical instrument 40 through each aperture 33. Preferably, apertures 38 are defined as holes to simulate incisions in operative cavities. If desired, a trocar stop (not shown) may be inserted into a flexible elastomeric cover (not shown) placed over each aperture 38, and a trocar (not shown) may be inserted into the trocar stop. Surgical instruments 40 may then be inserted through the trocars for increased realism in the training provided.

As discussed above, the training system of the present invention may be used to provide training in various videoendoscopic surgery techniques. In one exemplary use of system 10, surgical instruments 40 are endoscopic suturing instruments such as, for example, an ENDO STITCH endoscopic reciprocating suturing instrument manufactured by U.S. Surgical, Inc.

The present invention operates as follows. First wall 20 and second wall 26 are placed in their substantially upward positions, as described above and as shown in FIG. 1.

Second wall 26 is secured in place by placing retaining member 32 over second flange 30. A trainee places simulated anatomical structure 12 on base 14. The trainee then inserts surgical instruments 40 through apertures 38 to begin a videoendoscopic surgical training session.

Figure 2:
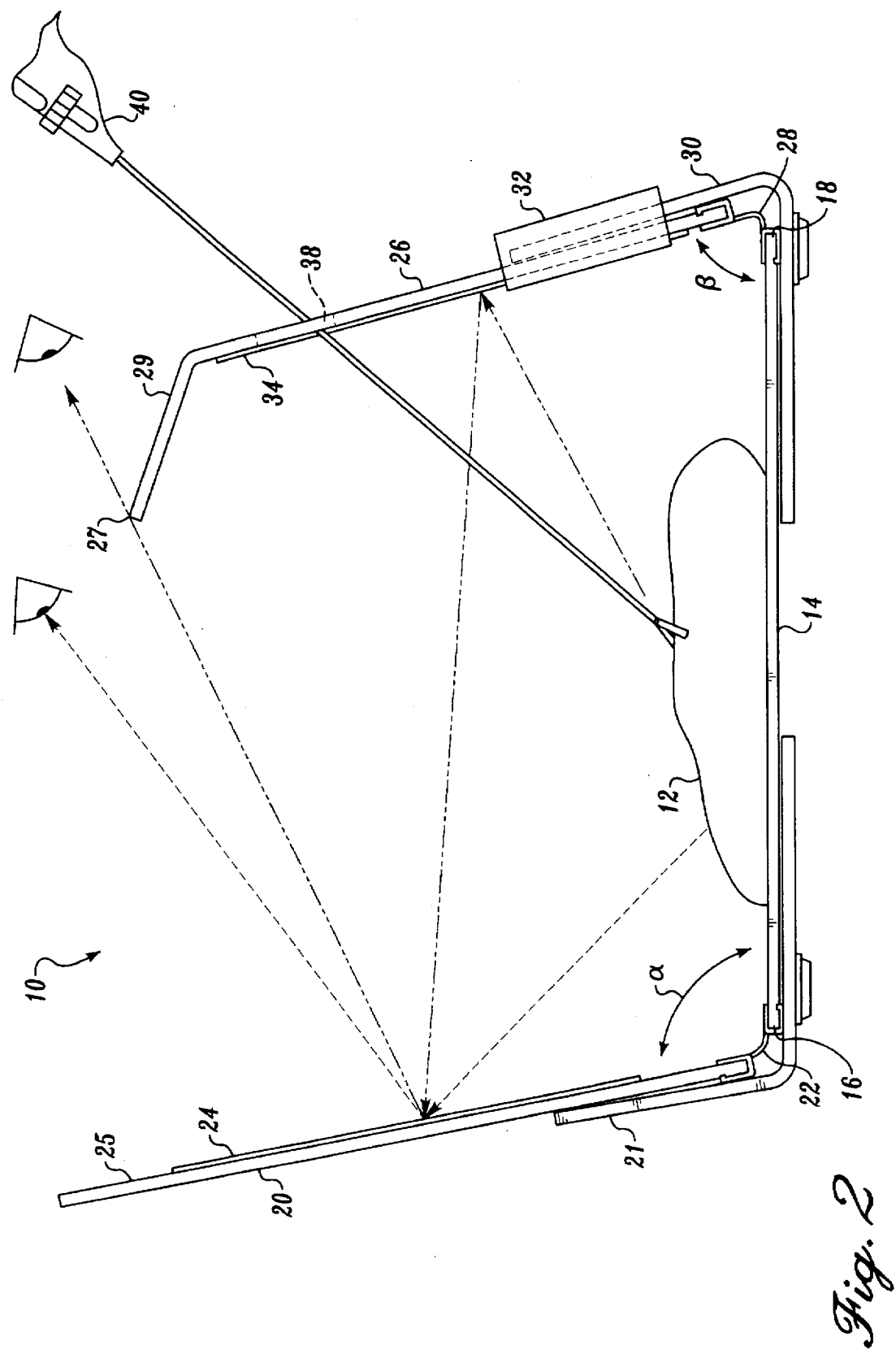
FIG. 2 provides an end view of the videoendoscopic surgical trainer of FIG. 1 with the sidewalls projecting upwardly for use.

As shown in FIG. 2, the trainee looks over the top edge 27 of second wall 26 at first mirror 24 and locates an image of simulated anatomical structure 12. The ray path shown in dashed lines illustrates a posterior view of anatomical structure 12. When the trainee is positioned such that indicator 36 appears at the top of first mirror 24, the image perceived by the trainee is one of features of simulated anatomical structure 12 that are oriented away from the trainee, i.e., a posterior view. Thus, system 10 simulates the visual responsiveness of a videoendoscopic camera that is positioned to image features of an anatomical structure that are oriented away from a surgeon. The trainee can then practice a videoendoscopic surgery technique, such as, for example, suturing, on sections of simulated anatomical structure 12 that are oriented away from the trainee.

The ray path shown in dot-and-dash lines illustrates an anterior view of anatomical structure 12. When the trainee is positioned to line up indicator 36 with top edge 27, the trainee will see an image of features of simulated anatomical structure 12 that are oriented toward the trainee. The features oriented toward the trainee are reflected by second mirror 34 toward first mirror 24. This reflected image is in turn reflected by first mirror 24 toward the trainee. Thus, system 10 simulates the visual response of a videoendoscopic surgical camera that is positioned to image features of an anatomical structure that are oriented toward a surgeon.

When the trainee is positioned intermediate the two orientations discussed above, the trainee can selectively focus on either an image of a posterior view or an image of an anterior view of anatomical structure 12. Indicator 36 appears between the posterior and anterior images as a demarcation.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A videoendoscopic surgery trainer for the practice of videoendoscopic surgery techniques on an anatomical structure, the trainer comprising:
   a base having first and second opposing sides, said base being arranged to receive an anatomical structure;
   a first wall projecting from the first side of said base;
   a second wall projecting from the second side of said base, said second wall having a finite height such that a direct line-of-sight view of the received anatomical object from the second side of the base is blocked, said first wall, second wall and base defining a cavity in which the received anatomical structure is disposed; and
   a first mirror attached to said first wall within the cavity, a reflective surface of said first mirror being oriented facing toward said second wall, for reflecting past said second wall a first two-dimensional image of the received anatomical structure.

2. The trainer of claim 1, further comprising:
   a second mirror attached to said second wall, a reflective surface of said second mirror being oriented facing toward said first wall, said second mirror being in optical communication with said first mirror for reflecting past said second wall a second two-dimensional image of the received anatomical structure viewed from the second side of said base.

3. The trainer of claim 2, wherein said first mirror has a first magnification power and said second mirror has a second magnification power, at least one of the first and second magnification powers being greater than unity.

4. The trainer of claim 3, wherein the first magnification power is greater than the second magnification power.

5. The trainer of claim 3, wherein the second magnification power is greater than the first magnification power.

6. The trainer of claim 1, wherein said first and second walls are hingedly attached to base.

7. The trainer of claim 1, wherein said first and second walls are positionable to project from said base in a substantially parallel disposition.

8. The trainer of claim 1, wherein said base further comprises first and second support flanges projecting substantially upwardly from the first and second sides, respectively, of said base, said first support flange being arranged for urging said first wall to project substantially upwardly from the first side of said base, the second support flange being arranged for urging said second wall to project substantially upwardly from the second side of said base.

9. The trainer of claim 1, wherein said first wall projects from the first side of said base at an obtuse angle with respect to said base, and said second wall projects from the second side of said base at an acute angle with respect to said base.

10. A videoendoscopic surgery trainer for the practice of videoendoscopic surgery techniques on an anatomical structure, the trainer comprising:

a base having first and second opposing sides, said base being arranged to receive an anatomical structure;

a first wall projecting from the first side of said base;

a second wall projecting from the second side of said base, said second wall having a finite height such that a direct line-of-sight view of the received anatomical object from the second side of the base is blocked; and a first mirror attached to said first wall, a reflective surface of said first mirror being oriented facing toward said second wall, for reflecting past said second wall a first two-dimensional image of the received anatomical structure, wherein said second wall comprises means for inserting surgical instruments.

11. The trainer of claim 10, wherein said means for inserting surgical instruments comprises a first section of said second wall, said first section defining at least a first aperture adapted to receive a surgical instrument.

12. A videoendoscopic surgery trainer for the practice of videoendoscopic surgery techniques on an anatomical structure, the trainer comprising:

a base having first and second opposing sides, said base being arranged to receive an anatomical structure;

a first wall projecting from the first side of said base;

a second wall projecting from the second side of said base, said second wall having a finite height such that a direct line-of-sight view of the received anatomical object from the second side of the base is blocked; and a first mirror attached to said first wall, a reflective surface of said first mirror being oriented facing toward said second wall, for reflecting past said second wall a first two-dimensional image of the received anatomical structure, further comprising:

indicia formed on said second wall for indicating a line-of-sight past an upper edge of said second wall.

13. A videoendoscopic surgery trainer for the practice of videoendoscopic surgery techniques on an anatomical structure, the trainer comprising:

a base having first and second opposing sides, said base being arranged to receive an anatomical structure;

a first wall projecting from the first side of said base, said first wall being hingedly attached to said base;

a second wall projecting from the second side of said base, said second wall being hingedly attached to said base, said second wall having a finite height such that a direct line-of-sight view of the received anatomical structure is blocked;

a first mirror attached to said first wall, a reflective surface of said first mirror being oriented facing toward said second wall, for reflecting past said second wall a first two-dimensional image of the received anatomical structure viewed from the first side of said base; and a second mirror attached to said second wall, a reflective surface of said second mirror being oriented facing toward said first wall, said second mirror being in optical communication with said first mirror for cooperatively reflecting past said second wall a second two-dimensional image of the received anatomical structure viewed from the second side of said base, wherein at least one of said first and second mirrors is disposed between the first and second walls to reflect the received anatomic structure.

14. The trainer of claim 13, further comprising:

means for indicating a demarcation between a first line of sight past said second wall to view the first two-dimensional image of the received anatomical structure and a second line of sight past said second wall to view the second two-dimensional image of the received anatomical structure.

15. The trainer of claim 14, wherein said indicating means comprises indicia marked on said second wall, the indicia being optically alignable with an upper edge of said second wall.

16. A method for training a trainee in videoendoscopic surgery techniques on an anatomical structure, the method comprising the steps of:

placing an anatomical structure on a base;

blocking a direct line-of-sight view of the anatomical structure with a shield;

performing a surgical procedure on the anatomical structure; and reflecting past the shield a reflected two-dimensional image of the anatomical structure corresponding to an at least partially lateral view of the anatomical structure.

17. The method of claim 16, wherein said reflecting step comprises the step of:

reflecting a first two-dimensional image of the anatomical structure viewed toward the shield.

18. The method of claim 17, wherein said reflecting step comprises the step of:

reflecting a second two-dimensional image of the anatomical structure viewed from the shield.

19. The method of claim 18, further comprising the step of:

selectively viewing relative to a demarcation indicia between a first line-of-sight past the shield to view the first two-dimensional image of the anatomical structure and a second line-of-sight past the shield to view the second two-dimensional image of the anatomical structure.

20. A videoendoscopic surgery trainer for the practice of videoendoscopic surgery techniques on an anatomical structure, the trainer comprising:

a housing including: a base for receiving anatomic structure, the base defining first and second sides; a first wall projecting upwardly from the first side of the base; and a second wall projecting upwardly from the second side of the base, the base and the first and second walls cooperatively defining a cavity in which the received anatomic structure is disposed, the housing defining at least one aperture for inserting surgical instruments into the cavity to manipulate the received anatomic structure; and a first mirror disposed within the cavity on one of the first and second walls for reflecting a two-dimensional image of the anatomic structure that is transmitted outside of the cavity for viewing by a user.

21. The trainer of claim 20, wherein the first mirror is disposed on the first wall and is positionable to reflect the image past an upper edge of the second wall.

22. The trainer of claim 21, wherein the second wall comprises an opaque material and the second wall has a height sufficient to block a direct line-of-sight view of the received anatomic structure from the second side of the base.

23. The trainer of claim 20, further comprising a second mirror disposed within the housing in optical communication with the first mirror to reflect the image therefrom outside of the cavity.

24. The trainer of claim 23, wherein at least one of the first and second mirrors comprises a magnification mirror.

25. The trainer of claim 20, wherein the first mirror comprises a magnification mirror.

26. The trainer of claim 20, wherein the at least one aperture is defined in one of the first and second walls to permit insertion of surgical instruments laterally into the cavity.

27. A videoendoscopic surgery trainer for the practice of videoendoscopic surgery techniques on an anatomical structure, the trainer comprising:

a housing including: a base for receiving anatomic structure, the base defining first and second sides; a first wall projecting upwardly from the first side of the base; and a second wall projecting upwardly from the second side of the base, the base and the first and second walls cooperatively defining a cavity in which the received anatomic structure is disposed, the housing defining at least one aperture for inserting surgical instruments into the cavity to manipulate the received anatomic structure; and a first mirror mounted within the housing adjacent and facing inwardly towards the received anatomic structure for reflecting a two-dimensional image of the anatomic structure that is transmitted outside of the cavity for viewing by a user.

* * * * *